United States Patent [19]

Moore et al.

[11] Patent Number: 5,775,722
[45] Date of Patent: Jul. 7, 1998

[54] PROTECTIVE POST-GUARD FOR A VEHICLE

[76] Inventors: Bruce A. Moore; Susan L. Moore, both of 29 N. Paquatuck Ave., East Moriches, N.Y. 11940

[21] Appl. No.: 700,913

[22] Filed: Aug. 21, 1996

[51] Int. Cl.⁶ .......................... B60R 21/34; B60R 27/00; B65D 65/08
[52] U.S. Cl. .......................... 280/727; 280/748; 150/166; D29/124
[58] Field of Search .......................... 280/727, 748, 280/750, 751, 762, 770; 150/166, 154, 167; 135/118; D29/124; D12/401, 403

[56] References Cited

U.S. PATENT DOCUMENTS

| | | | |
|---|---|---|---|
| 2,904,128 | 9/1959 | Boham et al. | 150/154 |
| 3,168,209 | 2/1965 | Brookins et al. | 150/154 |
| 3,981,340 | 9/1976 | Anderson et al. | |
| 3,982,602 | 9/1976 | Gorman | 280/727 |
| 4,538,385 | 9/1985 | Kandarian | 150/154 |
| 4,785,934 | 11/1988 | Hogle | |
| 4,834,157 | 5/1989 | Smith | |
| 4,858,361 | 8/1989 | White | |
| 4,880,130 | 11/1989 | Blake | 220/655 |
| 4,972,864 | 11/1990 | Almond | 135/118 |
| 4,997,229 | 3/1991 | Swanson | |
| 5,022,678 | 6/1991 | Mayfield | 150/154 |
| 5,037,122 | 8/1991 | Beckerer, Jr. | |
| 5,055,334 | 10/1991 | Lechuga | |
| 5,065,879 | 11/1991 | King | 150/154 |
| 5,125,704 | 6/1992 | Perechodnik | 280/770 |
| 5,127,265 | 7/1992 | Williamson et al. | |
| 5,167,267 | 12/1992 | McQuaid | |
| 5,207,323 | 5/1993 | McConnell | |
| 5,273,748 | 12/1993 | Walker | 150/166 |
| 5,277,306 | 1/1994 | Sargent | |
| 5,277,440 | 1/1994 | Jackson, Jr. | 280/727 |
| 5,293,975 | 3/1994 | Howorka | 150/154 |
| 5,318,251 | 6/1994 | Bergh | |
| 5,318,821 | 6/1994 | Bradley, Jr. | |
| 5,327,844 | 7/1994 | Kress | |
| 5,427,392 | 6/1995 | Duer | |

*Primary Examiner*—Peter C. English
*Attorney, Agent, or Firm*—Morgan & Finnegan LLP

[57] ABSTRACT

A protective post-guard apparatus and method for use in protecting rescue workers involved in vehicular rescue operations is disclosed. The post-guard is utilized to cover the jagged edges of exposed posts of a vehicle that has had the roof removed, or the steering wheel removed, thus affording access to victims in the vehicle.

19 Claims, 1 Drawing Sheet

PROTECTIVE POST-GUARD FOR A VEHICLE

FIELD OF THE INVENTION

The present invention relates generally to protective covers for vehicles, and particularly to protective covers for the jagged edges of posts exposed during a vehicular rescue operation.

BACKGROUND OF THE INVENTION

In vehicular rescue operations, in which people lay trapped and injured in their vehicles, it may become necessary to remove the roof from the vehicle in order to rescue victims therein. The procedure for removing the roof from the vehicle typically involves cutting the roofsupporting posts, removing the windshield, and peeling back the roof. Additionally, the steering wheel must sometimes be removed by cutting the steering post to afford access to victims. These processes leave exposed posts with jagged edges. These jagged edges are very hazardous to rescue workers, who must reach into or enter the vehicle to perform rescue operations on the trapped victims. The victims themselves are also at risk from sharp edges when they are extricated from the vehicle.

Typically, rescue workers have sought protection from the jagged edges of the exposed posts by wrapping duct tape around the exposed posts prior to entering the vehicle. This process can cost precious time in a rescue operation and may make the difference between life and death of the victim. In addition, the duct tape may not offer reliable protection because the exposed post may not be adequately wrapped, or a jagged edge may puncture the tape and injure a rescue worker. Furthermore, if time does not permit wrapping the exposed post, the rescue operation may have to be undertaken without any protection from the jagged edges.

SUMMARY OF THE INVENTION

It is the object of the present invention to create a protective cover for the exposed posts of a vehicle for protecting rescue workers involved in vehicular rescue operations.

It is a further object of the invention to make a protective cover of a flexible material for easy storage and transportation to the site of the rescue.

It is a further object of the invention to make a durable protective cover, not subject to puncture, to ensure a reliable and safe rescue operation for rescue workers.

It is still a further object of the invention to make the protective cover easy to see and manipulate by fast-moving rescue workers, who may be wearing heavy gloves and other protective gear upon approaching the vehicle, due to heat and other hazards. These and other objects are met by providing a protective cover which includes a cylinder, a cap, and fastening means. The cylinder has a top portion for pulling over an exposed post of a vehicle. The cap is attached to the top portion of the cylinder, and is used to arrest the cylinder when pulled over the exposed post, so that the cap abuts the jagged edges of the exposed post of the vehicle. The fastening means are used to tighten the cylinder to the exposed post and hold the protective cover in place.

Other objects, advantages and salient features of the invention will become apparent from the following detailed description, which taken in conjunction with the attached drawings, discloses the preferred but non-limiting embodiment of the invention.

DETAILED DESCRIPTION OF THE PREFERRED EMBODIMENTS

Figure 1:
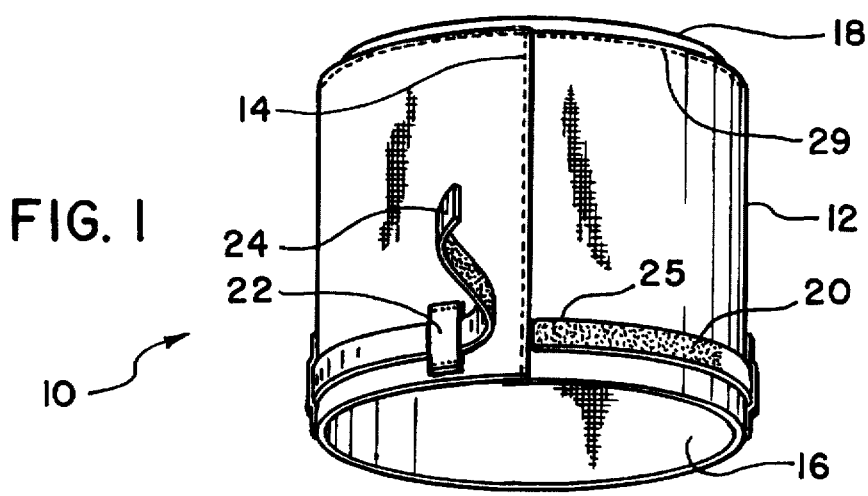
FIG. 1 is a depiction of a preferred embodiment of the present invention having a VELCRO fastening device.

FIG. 1 depicts a protective post-guard 10 of the present invention. The post-guard 10 is designed to fit over the jagged edges of an exposed post of a vehicle, during a vehicular rescue operation. The post-guard 10 has a sidewall, which may be comprised of one or more pieces. The piece or pieces may or may not intersect. In a preferred embodiment of the invention, the sidewall is a cylinder 12. The cylinder 12, typically 6 inches in diameter and 8 inches in height, is capable of being slid over the exposed post. The cylinder 12 may be made of a rigid, flexible, or elastic material. In a preferred embodiment of the invention, the cylinder 12 is made of a flexible material, such as canvas, nylon, or vinyl coated nylon, so that the cylinder 12 is collapsible for easy storage and transportation to the rescue site. The cylinder 12 can be constructed from a rectangular piece of material having ends sewn together at a seam 14. However, the ends of the cylinder 12 may also be joined with a variety of common techniques including gluing, riveting, or welding, depending on the properties of the material used for the cylinder 12. Furthermore, the cylinder 12 may be manufactured initially as a whole, for example by using a molding technique.

The cylinder 12 has an open end 16 so that the cylinder 12 may be slid over the exposed post. The cylinder 12 is closed at an opposite axial end with a cap 18, designed to arrest the post-guard 10 against the jagged edges of the exposed post, thus protecting rescue workers from injury.

The post-guard 10 may be held into place against the exposed post with a fastening device. In a preferred embodiment of the invention shown in FIG. 1, the fastening device is implemented with a commercial fastener having complementary micro-hooks and micro-loops, such as VELCRO. An elastic or non-elastic cord, string, rope or strap 20 completely surrounds the cylinder 12 and may be attached at one end 25 to the cylinder 12 using any common technique including by sewing, riveting, or welding the strap 20 to the cylinder 12. The strap 20 may be attached at the seam 14 as shown in FIG. 1. The strap 20 may be attached anywhere along the length of the cylinder 12, and in a preferred embodiment of the invention is attached at the middle. In order to facilitate manipulation and the effectiveness of the strap 20, one or more loops 22 may be formed on the cylinder 12 to hold the strap 20 in place. In a preferred embodiment of the invention, these loops 22 may be formed by attaching additional material to the cylinder 12 as shown in FIG. 1. Alternatively, the loops 22 may be formed by cutting slits into the cylinder through which the strap will run.

When using the post-guard 10 having the fastening device of FIG. 1, the cylinder 12 will be pulled over the exposed post until the cap 18 abuts the jagged edges of the exposed post. Subsequently, an unattached end 24 of the strap 20 will be pulled and fastened by the rescue worker to an attached end 25. This will cause the circumference of the strap 20 to decrease, thereby tightly holding the cylinder 12 beneath the strap 20 against the exposed post. In this way, the exposed post can be quickly covered for the duration of a rescue operation, thus protecting rescue workers from being cut by jagged edges.

In an alternate embodiment of the invention, the strap 20 does not surround the cylinder 12. Rather, a strap or straps are disposed against the cylinder 12 in at least 2 places. The strap or straps include complementary micro-hooks and micro-loops for fastening. The strap or straps are then pulled, thus constricting a portion of the cylinder 12, and the complementary micro-hooks and micro-loops are brought together to hold the strap or straps in place.

Figure 2:
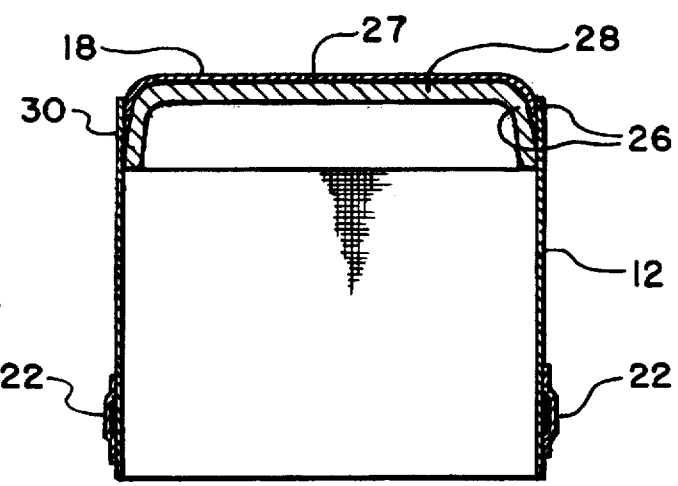
FIG. 2 is a cross sectional view of the post guard through a vertical plane containing the central axis of the cylinder.

FIG. 2 illustrates a cross section of a preferred embodiment of the post-guard 10 at a plane containing the central axis of the cylinder 12. This figure illustrates the manner of attachment of the cap 18 to the cylinder 12. The cap 18 preferably has a radius at least one inch greater than the radius of the cylinder 12. Thus, the cap 18 has overlapping ends 26 which facilitate attachment. The cap 18 itself may be made of a rigid, flexible, or elastic material, and is designed to resist puncture from the jagged edges of the exposed post. In a preferred embodiment of the invention, the cap 18 comprises a circular piece of flexible material, for instance canvas, nylon, or vinyl coated nylon 27, and a flexible circular pad 28, each having approximately an 8 inch diameter. The pad 28 is disposed against the vinyl coated nylon 27 so that the pad 28 and the vinyl coated nylon 27 are concentric. Then, the overlapping ends 26 of the pad 28 and the vinyl coated nylon 27 of the cap 18 are attached to the an end portion 30 of the cylinder 12. Attachment may be accomplished using a variety of techniques, including a circular seam 29 as shown in FIG. 1. Thus, the overlapping ends 26 of the pad 28 extend down into the cylinder 12 and provide additional protection from puncture for an end portion 30 of the cylinder 12. The end portion 30 is defined by the depth of penetration of the overlapping ends 26 into the cylinder 12. Furthermore, the pad 28 and vinyl coated nylon 27 of the cap 18 are flexible allowing for easy collapse, storage and transportation of the post-guard 10 to the accident scene.

Instead of using a flexible pad 28, a rigid member can be used in conjunction with the cap 18 to implement a more durable and puncture resistant top. The rigid member may be attached to the cap 18 using any conventional attachment technique including gluing, sewing, or riveting.

Furthermore, the cap 18 and the sidewall may be manufactured as an integral whole, for example by using a molding technique.

Figure 3:
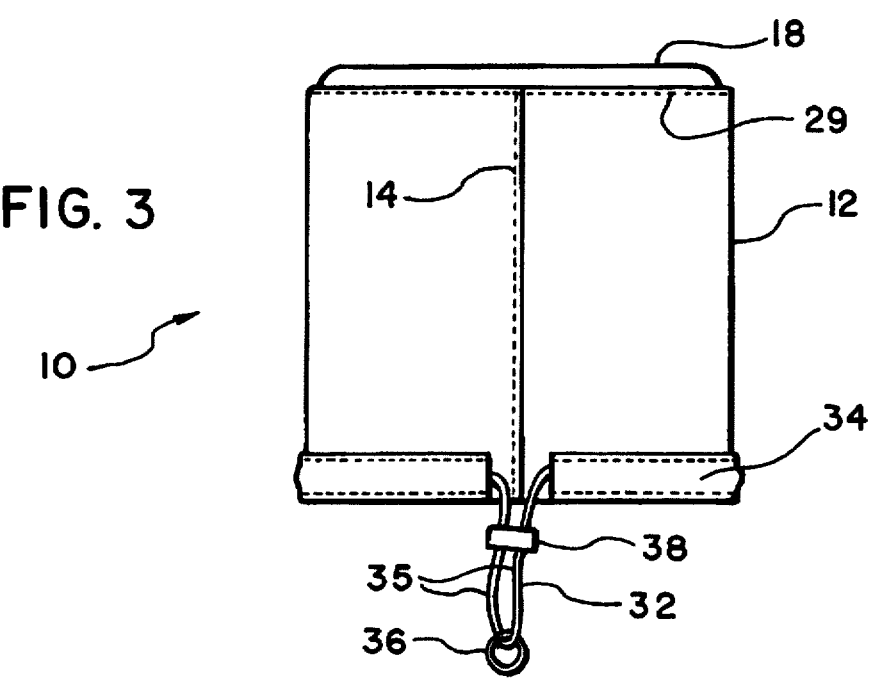
FIG. 3 is a depiction of a second preferred embodiment of the present invention having a pull-cord fastening device.

FIG. 3 illustrates another embodiment of the invention, in which the fastening device is implemented with a pull-cord 32, surrounding the cylinder 12. The cylinder 12 has a guide 34 disposed against its inner or outer surface. The guide 34 may be continuous, or may be comprised of a loop or loops as with the VELCRO example of FIG. 1. Furthermore, the guide 34 is disposed against the cylinder 12 in a plane perpendicular to the central axis of the cylinder 12, and may be placed anywhere along the length of the cylinder 12. In a preferred embodiment of the invention, the pull-cord 32 is placed at the middle of the seam 14 of the cylinder 12.

The pull-cord 32 is then routed within the guide 34 and completely surrounds the cylinder 12. The pull-cord 32 extends from the guide 34 to exposed ends 35 and may be attached to a ring 36 to facilitate gripping the pull-cord 32. Attached to the exposed ends 35 of the pull-cord 32 is a fastener 38. This fastener 38 may be implemented with any conventional technique, including a toggle, and is used to prevent the pull-cord 32 from slipping through the fastener 38.

In using the post-guard 10 of FIG. 3, after the cylinder 12 has been pulled over the roof-supporting post, the pull-cord 32 is pulled thus cinching the circumference of the cylinder 12 against the roof-supporting post. Then, the fastener 38 is set to hold the post-guard 10 in place.

In an alternate embodiment of the invention, a pull-cord may not completely surround the cylinder 12. Rather, a pull-cord or cords may be disposed against the cylinder 12 in at least two places. Pulling the cord or cords thus will cinch a portion of the cylinder 12 against the exposed post. The pull-cord may then be fastened by tying or using a fastener 38.

To facilitate seeing the post-guard 10 in dark or unfavorable conditions, the post-guard 10 may be constructed of or painted with bright colors typically used in emergency rescue.

While preferred embodiments have been shown and described, it will be understood that it is not intended to limit the disclosure, but rather it is intended to cover all modifications falling within the spirit and scope of the invention as defined in the appended claims or their equivalents.

We claim:

1. A protective cover for covering jagged edges of an exposed post of a crashed vehicle, the exposed post being formed in situ during a rescue operation, comprising:

a sidewall having opposite axial ends and enveloping an end portion of the exposed post of the crashed vehicle; and a cap, disposed at one of the axial ends of the sidewall, and having an inside surface contacting the jagged edges of the exposed post of the crashed vehicle when fitted thereon.

2. The protective cover according to claim 1, wherein the sidewall comprises a flexible material.

3. The protective cover according to claim 1, wherein the sidewall comprises an elastic material.

4. The protective cover according to claim 1, wherein the sidewall comprises a rigid material.

5. The protective cover according to claim 1, wherein the cap comprises a flexible material.

6. The protective cover according to claim 1, wherein the cap comprises an elastic material.

7. The protective cover according to claim 1, wherein the cap comprises a rigid material.

8. The protective cover according to claim 1, wherein the cap and the sidewall are integrally formed.

9. The protective cover according to claim 1, wherein the sidewall is a substantially continuous sidewall.

10. The protective cover according to claim 1, wherein the cap further comprises a pad having an inside surface for abutting the exposed post.

11. The protective cover according to claim 1, further comprising means, coupled to the sidewall, for securing the sidewall to the exposed post.

12. The protective cover according to claim 11, wherein the securing means comprises a pull-cord substantially circumscribing the sidewall.

13. The protective cover according to claim 11, wherein the securing means comprises a strap substantially circumscribing the sidewall.

14. The protective cover according to claim 13, wherein the strap includes complementary coupling means.

15. The protective cover according to claim 14, wherein the complementary coupling means includes microhooks and micro-loops.

16. The protective cover according to claim 14, further comprising at least one loop, disposed on the sidewall, wherein the strap passes through the loop to hold the strap to the sidewall.

17. The protective cover according to claim 11, wherein the fastening means comprises:

a guide, disposed against a surface of the sidewall;

a cord, disposed within the guide, and having exposed ends for pulling and thereby constricting the sidewall; and a fastener, attached to the exposed ends of the cord, inhibiting movement of the cord relative to the fastener when set.

18. A method of preventing injury to rescue personnel working in the vicinity of a crashed vehicle having at least one exposed post formed in situ during a rescue operation, comprising the steps of:

using a protective cover to envelop jagged edges of the exposed post; and maintaining the protective cover in place for the duration of the rescue operation with securing means.

19. The method according to claim 18, further comprising the step of:

adjusting the securing means to tighten the protective cover to the exposed post.

* * * * *